United States Patent
Vogt

[11] Patent Number: 5,975,584
[45] Date of Patent: Nov. 2, 1999

[54] CARRIER CARD WITH VALUE CHIP

[75] Inventor: Werner R. Vogt, Rue Fritz-Courvoisier, Switzerland

[73] Assignee: Adaptech S.A., La Chaux-de-Fonds, Switzerland

[21] Appl. No.: 08/706,197

[22] Filed: Aug. 30, 1996

[51] Int. Cl.[6] .................................................. B42D 15/00
[52] U.S. Cl. ............................ 283/98; 283/100; 283/51; 283/56; 283/904
[58] Field of Search ................................ 283/51, 56, 100, 283/76, 904, 77, 98; 235/487, 488, 492

[56] References Cited

U.S. PATENT DOCUMENTS

| | | |
|---|---|---|
| 3,376,661 | 4/1968 | Hulett . |
| 3,571,957 | 3/1971 | Cumming et al. . |
| 4,276,704 | 7/1981 | Heller . |
| 4,393,610 | 7/1983 | Adrian . |
| 4,443,027 | 4/1984 | McNeely et al. .................... 283/904 X |
| 4,511,796 | 4/1985 | Aigo ........................................ 235/492 |
| 4,546,251 | 10/1985 | Schaffer . |
| 5,228,723 | 7/1993 | Hertig .................................... 283/56 X |
| 5,336,877 | 8/1994 | Raab et al. ........................... 235/492 X |
| 5,350,553 | 9/1994 | Glaser et al. . |
| 5,362,955 | 11/1994 | Haghiri-Tehrani ...................... 235/492 |
| 5,531,145 | 7/1996 | Haghiri-Tehrani . |
| 5,677,524 | 10/1997 | Haghiri-Tehrani ...................... 235/492 |
| 5,681,356 | 10/1997 | Barak et al. . |
| 5,726,432 | 3/1998 | Reichardt ............................ 235/492 X |

*Primary Examiner*—Frances Han
*Attorney, Agent, or Firm*—Robert W. Becker & Associates

[57] ABSTRACT

A carrier card of standardized size has a base body with at least one cutout for receiving a value chip. The cutout has securing elements forming a snap connection for detachably securing the value chip. The cutout is positioned such on the base body of the carrier card that the value chip in the cutout is usable with standardized application devices. The value chip is removable so as to be used as a minichip card with processing devices that are smaller than the application devices. The cutout has wave-shaped edges with alternating projections and depressions. The base body has a bore for each one of the projections, wherein each one of the bores is arranged perpendicular to the respective projection such that an elastic stay is formed. A cover foil is connected to one face of the base body so as to cover the cutout. At least one of the wave-shaped edges is undercut such that the cutout widens toward the cover foil.

5 Claims, 3 Drawing Sheets

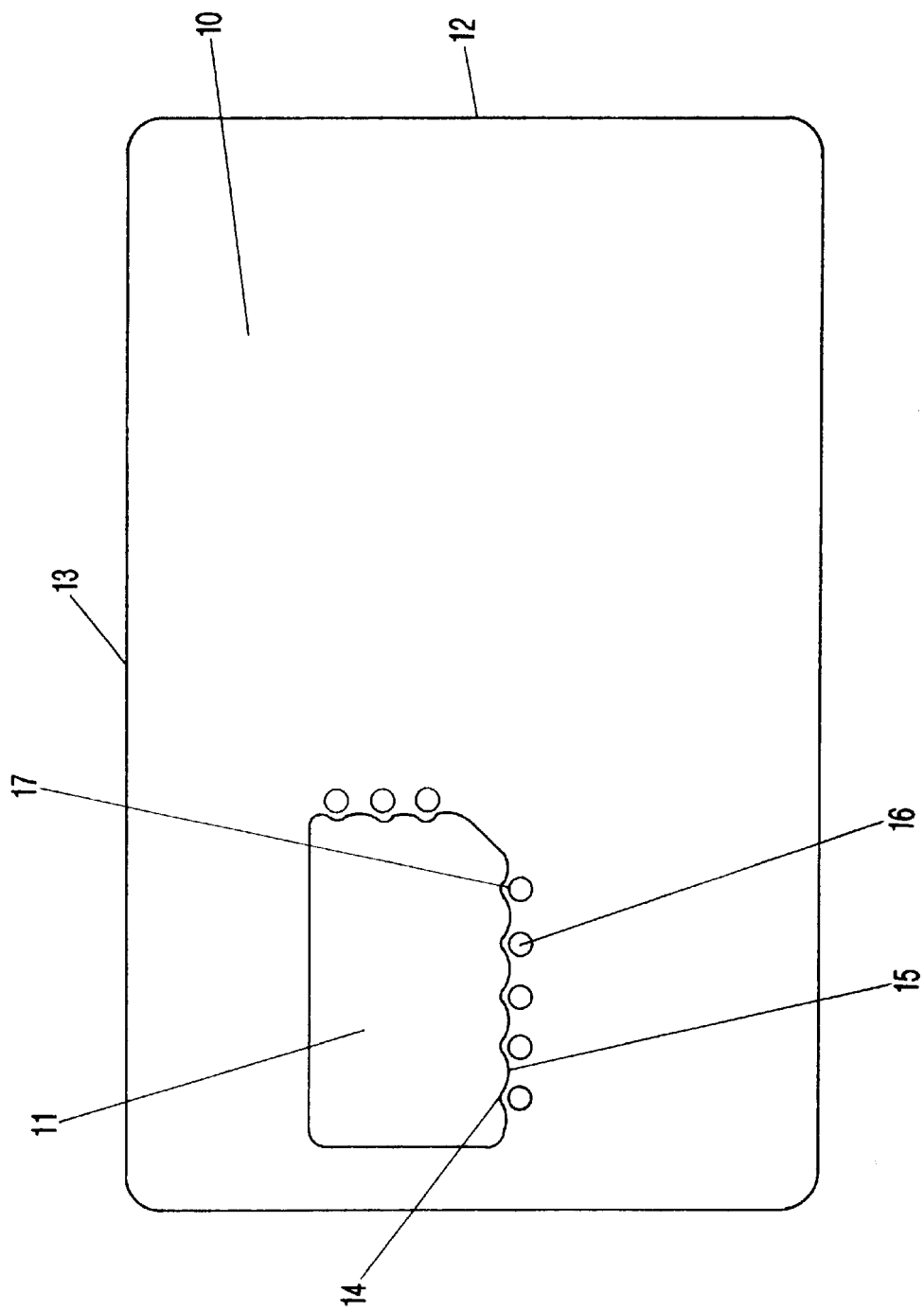

CARRIER CARD WITH VALUE CHIP

BACKGROUND OF THE INVENTION

The present invention relates to a carrier card, having outer dimensions corresponding to an industrial standard, for receiving a value chip which carrier card is provided with at least one cutout for receiving the value chip and securing it with a snap connection.

A carrier card with the aforementioned features is known from U.S. Pat. No. 5,228,723. The carrier card is provided with a plurality of cutouts into which value chips can be detachably secured whereby they are either unitarily connected with the carrier card and are provided with perforations allowing removal or, alternatively, are reinsertable and securable with a snap connection into the corresponding cutout of the carrier card.

A field of application not addressed in U.S. Pat. No. 5,228,723 for such carrier cards is, for example, especially modern telecommunication and banking technology. In these areas such value chips or carrier cards are subject to international standards in order to ensure that upon insertion of such cards into a corresponding device the respective value chip can be read. Such devices, depending on their design, require the insertion of a carrier card with value chip arranged thereat in a certain area, or, it is also possible to simply insert the value chip which is substantially smaller, such value chips being known under the name SIM module card.

One problem to be solved in this context is that a carrier card should be designed with respect to receiving a value chip such that the carrier card is usable with the attached value chip as well as that the value chip, i.e., a so-called SIM module card, can be removed from the carrier card and can be inserted into a corresponding processing device by itself.

SUMMARY OF THE INVENTION

A carrier card of standardized size for receiving a value chip according to the present invention is primarily characterized by:

A base body with at least one cutout for receiving a value chip;

The cutout having securing elements forming a snap connection for detachably securing the value chip;

The cutout positioned such on the carrier card that the value chip in the cutout is usable with standardized application devices, wherein the value chip is removable so as to be used as a minichip card with processing devices that are smaller than the application devices;

The cutout having wave-shaped edges with alternating projections and depressions;

The base body having a bore for each one of the projections, wherein each one of the bores is arranged perpendicular to the respective projection such that an elastic stay is formed;

A cover foil connected to one phase of the base body so as to cover the cutout;

At least one of the wave-shaped edges being undercut such that the cutout widens toward the cover foil.

Advantageously, the cutout is substantially rectangular and all of the wave-shaped edges are undercut.

In an alternative embodiment, two adjacent ones of the wave-shaped edges are undercut.

It is also possible that two oppositely arranged wave-shaped edges are undercut.

In another preferred embodiment of the present invention, the base body comprises two cutouts. The base body has two oppositely arranged insertion edges and each one of the cutouts is arranged relative to one of the insertion slots so as to be usable with standardized application devices.

According to the present invention, it is thus suggested that the cutout within the base body of the carrier card is arranged such that the carrier card with value chip secured thereat can be used with corresponding standardized application devices for reading/processing the value chip and, optionally, the value chip can be removed from the cutout of the carrier card and can be used as an independent minichip card with substantially smaller processing devices. For forming a secure snap connection for the value chip, the edges of the cutout have a wave shape with a sequential arrangement of projections and depressions whereby each one of the projections has coordinated therewith a bore provided in the base body of the carrier card such that the bore is arranged perpendicular to the projection and forms an elastic stay. The carrier card at one face is provided with a cover foil covering the cutout. At least one of the wave-shaped edges of the cutout is undercut such that the cutout widens toward the cover foil.

The invention has the advantage that the value chip, preferably in the form of a SIM module card, can be securely held with the snap connection within the carrier card. The special advantage of the snap connection provided at the edges of the cutout within the base body of the carrier card is that with the wave-shaped contour of the edges having a sequence of projections and depressions a tolerance compensation is possible. This is necessary because, during the manufacture of value chips, tolerance fluctuations cannot be prevented which for known snap connections disadvantageously affect the reliability of the snap connection. It has been shown that with conventionally used plastic materials for manufacturing corresponding cards, respectively, value chips a width of the stay provided in the area of the projections in the range of between 2 to 5 tenth of a millimeter is sufficient to ensure the desired elastic snap connection.

The clamping action (snap connection) is furthermore advantageously improved in that the cutout at the base body of the carrier card is covered at one face of the carrier card with a cover foil. This provides in an advantageous manner a receiving chamber for the value chip which is closed off at one side. It is thus prevented that the value chip for a comparatively thin carrier card can be accidentally pressed through the cutout. Furthermore, the invention has the advantage that, after insertion of the value chip, the value chip can be removed from the cutout of the carrier card simply by pressing onto the cover foil. However, in order to ensure that not already by bending the carrier card the value chip can fall out of the cutout, it is furthermore suggested with the present invention that the edges of the cutout are undercut such that the cutout widens in the direction toward the foil. Thus, a directed pressure to be applied to the cover foil covering the cutout is required in order to be able to remove the value chip secured by the snap connection, improved by the undercuts, from the cutout of the carrier card.

According to further embodiments of the invention it is suggested that the undercut is provided at all limiting edges or, alternatively, only two adjacent ones of the edges, respectively, two oppositely arranged ones of the edges.

In another embodiment of the invention it is suggested that for receiving two value chips the base body of the carrier card is provided with two cutouts positioned relative to oppositely arranged insertion edges of the carrier card such that the carrier card can be used by inserting either end. This allows in an advantageous manner to use one single carrier card for securing two value chips with different information memories in the form of semiconductor chips. For example, telephone card chips can be arranged for different international telephone systems. This embodiment of the invention is applicable for uses of two different information components with one single carrier card.

BRIEF DESCRIPTION OF THE DRAWINGS

The object and advantages of the present invention will appear more clearly from the following specification in conjunction with the accompanying drawings, in which:

FIG. 1 is a carrier card with a cutout provided with edges defining a snap connection, shown in a plan view onto the open side of the cutout without inserted value chips;

DESCRIPTION OF PREFERRED EMBODIMENT

The present invention will now be described in detail with the aid of several specific embodiments utilizing FIGS. 1 through 4.

Figure 1A:
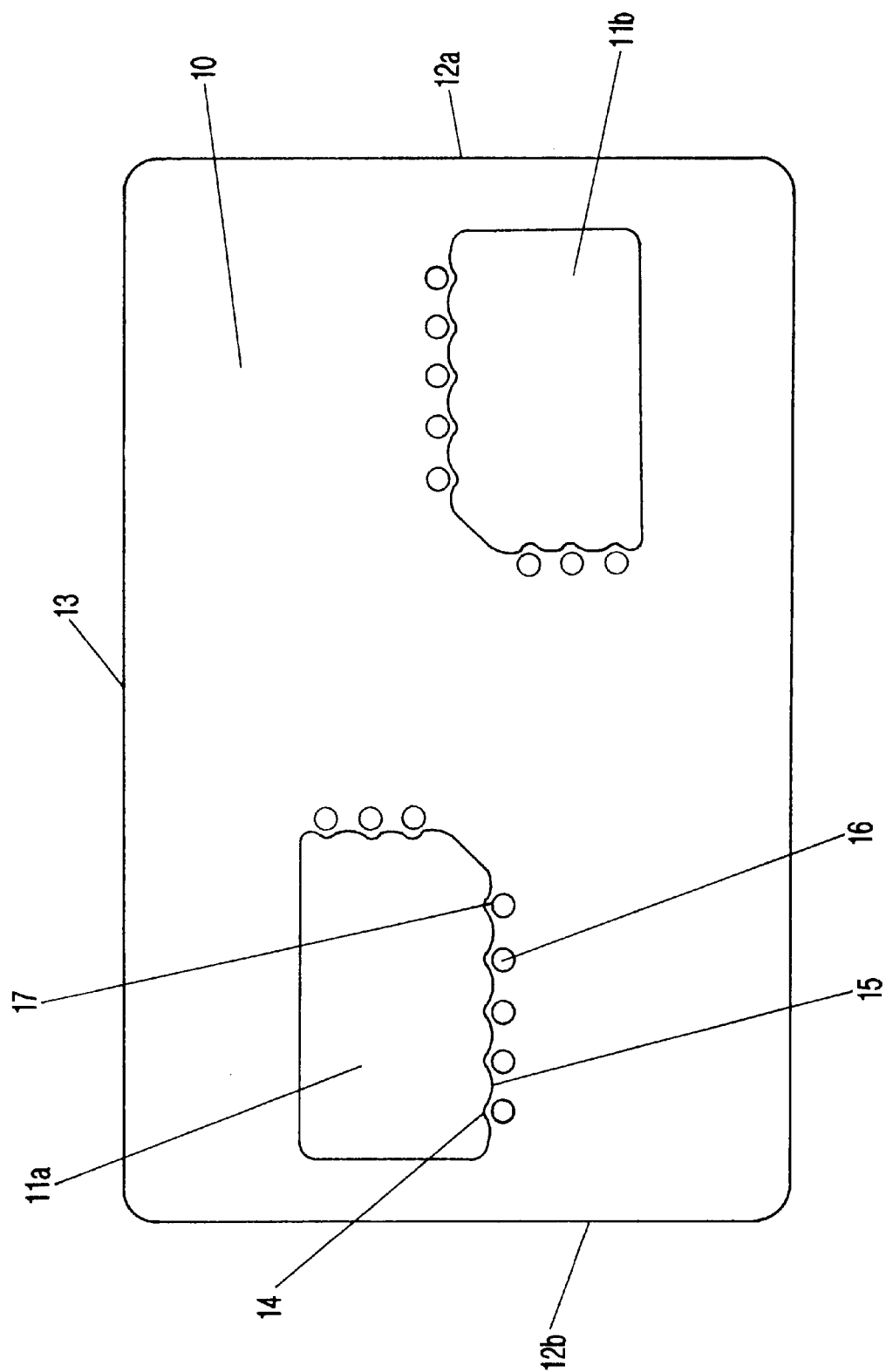
FIG. 1a shows a carrier card with two cutouts 11a, 11b and two opposite insertion edges 12a, 12b.
Figure 3:
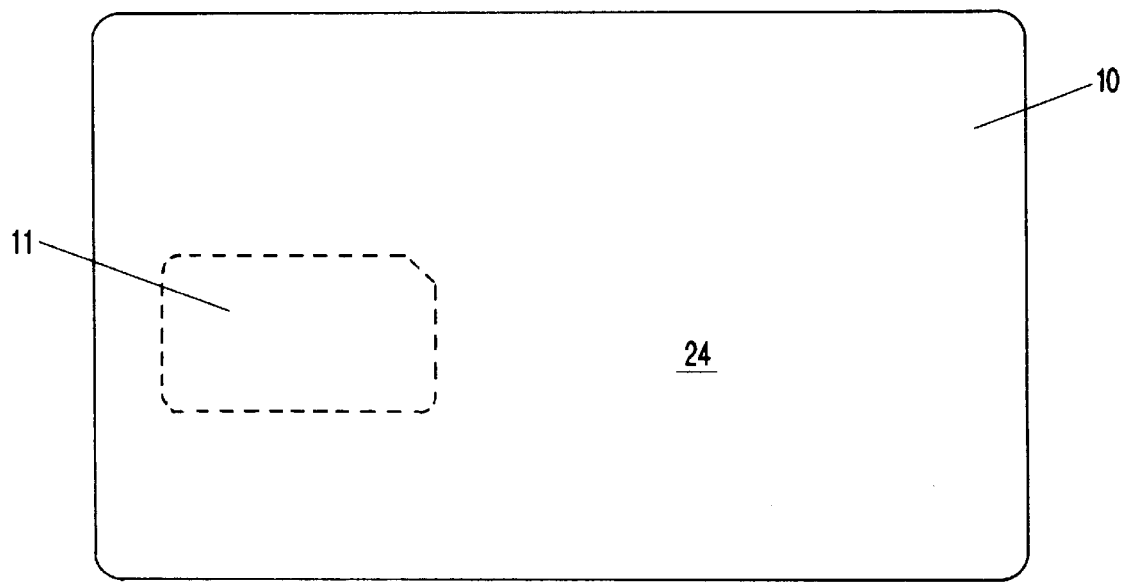
FIG. 3 shows the carrier card of FIG. 1 in a rear view with the cutout covered by the cover foil.

The carrier card represented in FIGS. 1 and 3 corresponds in length and width to the ISO standard whereby the base body 10 of the carrier card at its longitudinal side edge 13 measures 18.5 mm and at its narrow side edge 12 measures 54.0 mm and has a material thickness of 0.86 mm with a tolerance of ±0.1 mm. The outer edges of the carrier card 10 are rounded with a radius of 2.0 mm.

Figure 2:
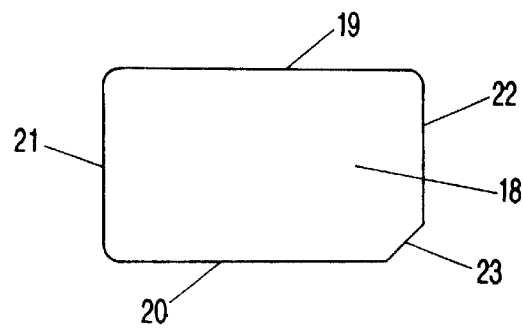
FIG. 2 is an individual representation of a value chip to be inserted into the cutout of the carrier card.

A cutout 11 is arranged at the base body 10 of the carrier card having a size that matches the size of the individually represented value chip 18 of FIG. 2 so that the value chip 18 can be secured by a snap connection within the cutout 11. The value chip 18 is especially embodied as a so-called SIM module card corresponding to the respective international standard. The cutout 11 is located within the base body 10 of the carrier card where for a standardized telephone card, for example, the chips with respectively saved value information (monetary value) would be arranged.

Since for the manufacture of value chips 18 tolerances of up to 0.1 mm are allowed, it must be ensured with respect to the embodiment of the edges of the cutout 11 that even for a deviation of maximal 0.2 mm these standardized value chips 18 can be securely clamped by a snap connection within the cutout 11. For this purpose, the edges of the cutout 11 are provided with a wave-shaped contour with a sequence of projections 14 and depressions 15 whereby each projection 14 has coordinated therewith a bore 16 within the base body which is arranged perpendicular to the projection 14 and thus forms an elastic stay 17 in the area of each projection 14. It is understood that the inner width of the cutout 11 between the edges, respectively, its projections 14 is to be matched to the smallest allowable size of the value chip 18.

The value chip 18 which is represented in detail in FIG. 2 is in its size substantially smaller than the carrier card (10). The value chip 18 has a beveled corner 23. Relative to this corner 23 the longer longitudinal edge 19 measures 25.1 mm, the shorter longitudinal edge 20 measures 22.6 mm, the longer transverse edge 21 measures 15.1 mm, and the shorter transverse edge 22 measures 12.6 mm.

Figure 4:
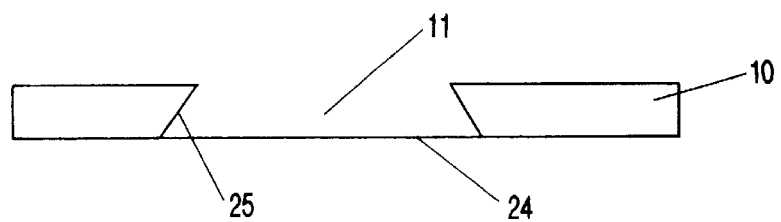
FIG. 4 shows the carrier card of FIGS. 1 and 3 in a section through the cutout.

As can be seen in FIGS. 3 and 4, the carrier card is covered on one side with a cover foil 24 so that cutout 11 at one face of the base body 10 is closed off by the cover foil 24. This provides a closed receiving chamber for the value chip. Furthermore, it is shown in FIG. 4 that the wave-shaped edges are provided with an undercut 25 which widens in the direction toward the cover foil 24. The cover foil 24 prevents an accidental release of the value chip 18 from the cutout 11, for example, by bending the carrier card 10.

The present invention is, of course, in no way restricted to the specific disclosure of the specification and drawings, but also encompasses any modifications within the scope of the appended claims.

What I claim is:

1. A carrier card of standardized size for receiving a value chip, said carrier card comprising:

a base body with at least one cutout for receiving a value chip;

said cutout having securing elements forming a snap connection for detachably securing the value chip;

said cutout positioned such on said carrier card that the value chip in said cutout is usable with standardized application devices, wherein the value chip is removable so as to be used as a mini chip card with processing devices that are smaller than said application devices;

said cutout having wave-shaped edges with alternating projections and depressions;

said base body having a bore for each one of said projections, wherein each one of said bores is arranged perpendicular to said respective projection such that an elastic stay is formed;

said elastic stays compensating manufacturing tolerances of a value chip received in said cutout to safely secure the value chip in said cutout;

a cover foil connected to one face of said base body so as to cover said cutout;

at least one of said wave-shaped edges being undercut such that said cutout widens toward said cover foil.

2. A carrier card according to claim 1, wherein said cutout is substantially rectangular and wherein all of said wave-shaped edges are undercut.

3. A carrier card according to claim 1, wherein two adjacent ones of said wave-shaped edges are undercut.

4. A carrier card according to claim 1, wherein two oppositely arranged wave-shaped edges are undercut.

5. A carrier card according to claim 1, wherein said base body comprises two of said cutouts, wherein said base body has two oppositely arranged insertion edges and wherein each one of said cutouts is arranged relative to one of said insertion slots so as to be usable with the standardized application devices.

* * * * *